United States Patent
Kim

(10) Patent No.: US 12,491,850 B2
(45) Date of Patent: Dec. 9, 2025

(54) ELECTROMECHANICAL BRAKE SYSTEM AND CONTROL METHOD THEREOF

(71) Applicant: HL MANDO CORPORATION, Gyeonggi-do (KR)

(72) Inventor: Seongnam Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 172 days.

(21) Appl. No.: 18/228,670

(22) Filed: Jul. 31, 2023

(65) Prior Publication Data
US 2024/0278754 A1    Aug. 22, 2024

(30) Foreign Application Priority Data
Feb. 21, 2023  (KR) .......... 10-2023-0022685

(51) Int. Cl.
*B60T 17/22* (2006.01)
*B60T 8/1755* (2006.01)

(52) U.S. Cl.
CPC .......... *B60T 8/1755* (2013.01); *B60T 17/221* (2013.01); *B60T 2220/04* (2013.01); *B60T 2270/402* (2013.01)

(58) Field of Classification Search
CPC .. B60T 8/1755; B60T 17/221; B60T 2220/04; B60T 2270/402
See application file for complete search history.

(56) References Cited

U.S. PATENT DOCUMENTS

| 10,214,190 B2 * | 2/2019 | Mannherz ............... B60T 8/172 |
| 2022/0024433 A1 * | 1/2022 | Yuyama ............... F16D 65/183 |

FOREIGN PATENT DOCUMENTS

| KR | 10-2021-0127707 | 10/2021 |
| KR | 10-2022-0057597 | 5/2022 |

* cited by examiner

*Primary Examiner* — Gonzalo Laguarda
(74) *Attorney, Agent, or Firm* — WOMBLE BOND DICKINSON (US) LLP

(57) ABSTRACT

Disclosed herein are an electromechanical brake system and a control method thereof. In accordance with one aspect of the present disclosure, there is provided an electromechanical brake system including electromechanical brakes respectively provided on four wheels of a vehicle, a sensor part that outputs a signal which corresponds to or is capable of estimating whether each of the electromechanical brakes is normal and a driver demand braking torque generated based on the speed and lateral acceleration of the vehicle and a brake pedal operation of a driver, and a controller that estimates a demand braking torque based on the signal received from the sensor part and determines whether the electromechanical brakes are normal, wherein the controller performs a braking control as much as the demand braking torque based on the determination that the electromechanical brakes are normal, and performs a braking control by distributing, within a range of the demand braking torque, braking torques based on the lateral acceleration of the vehicle to the respective other electromechanical brakes except the electromechanical brake determined to malfunction based on the determination that there is a malfunction of any one among the electromechanical brakes.

20 Claims, 11 Drawing Sheets

[FIG. 1]
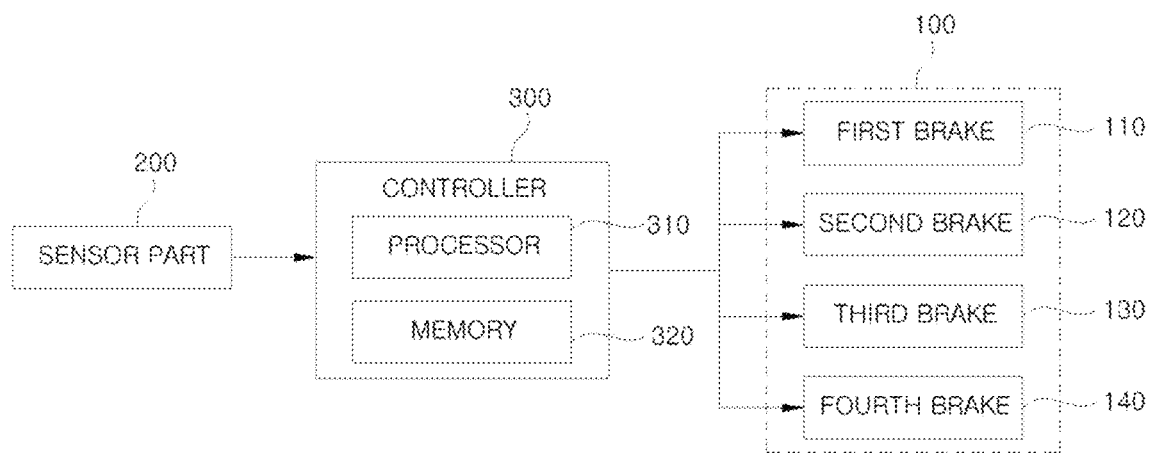

[FIG. 2]
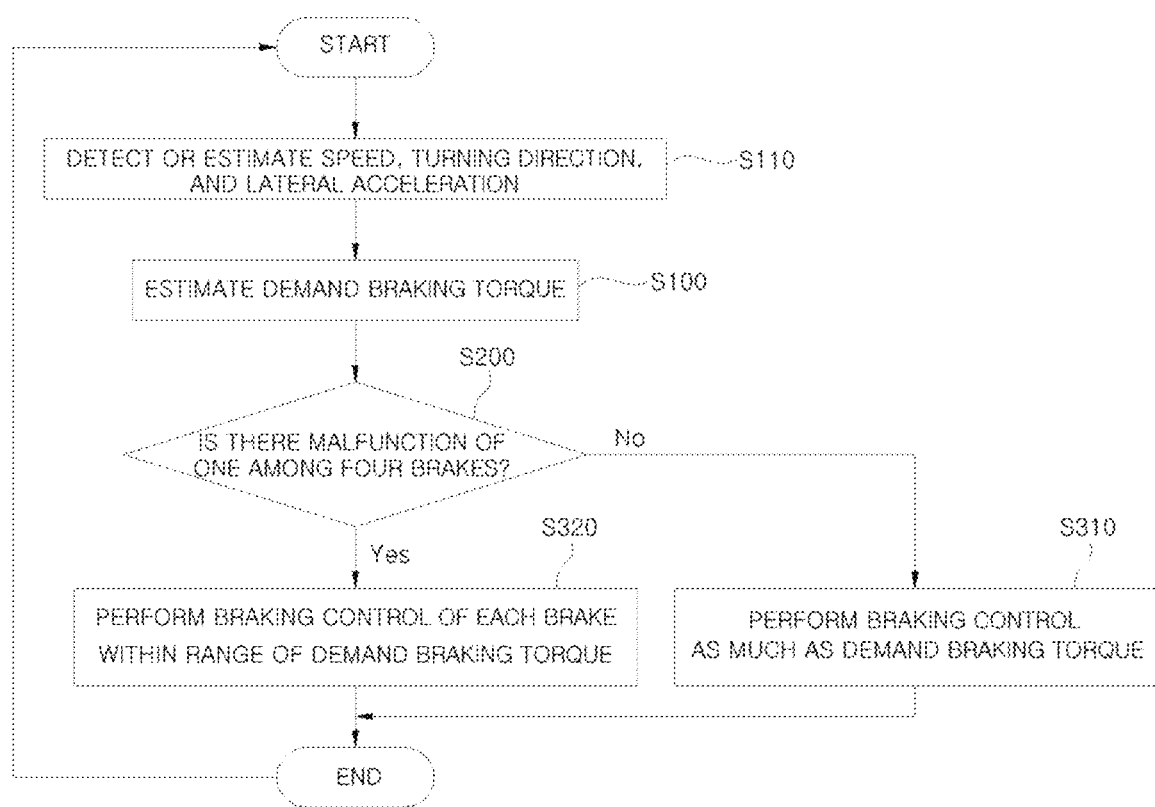

[FIG. 3a]
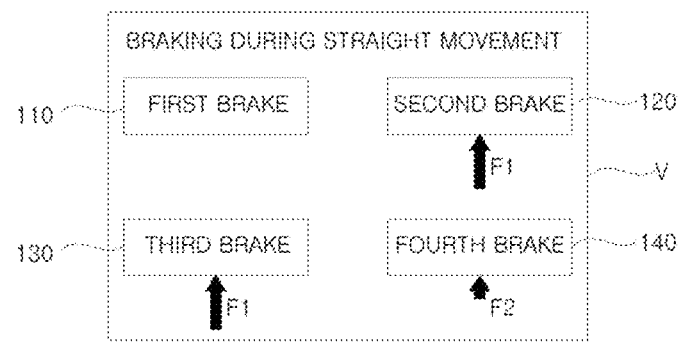
[FIG. 3b]
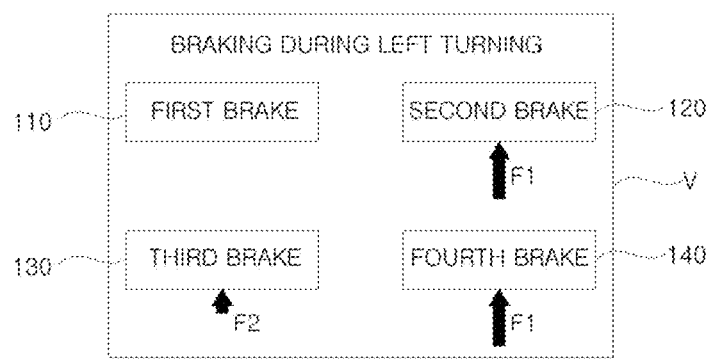
[FIG. 3c]
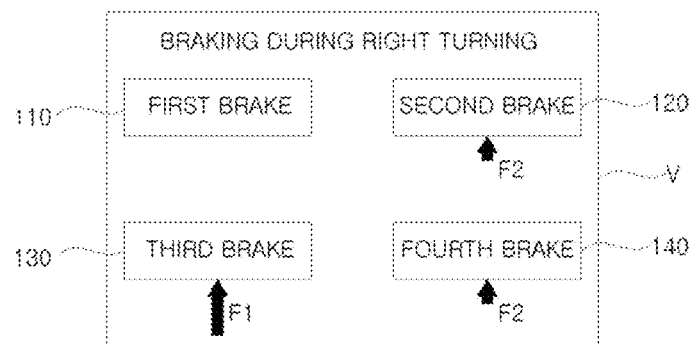

[FIG. 4a]
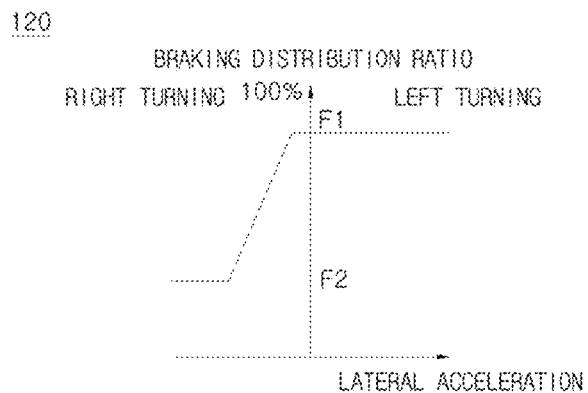
[FIG. 4b]
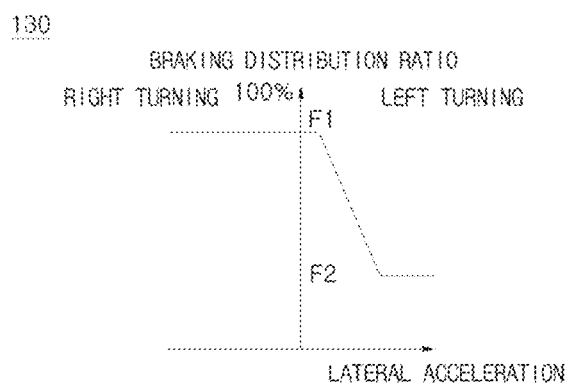
[FIG. 4c]
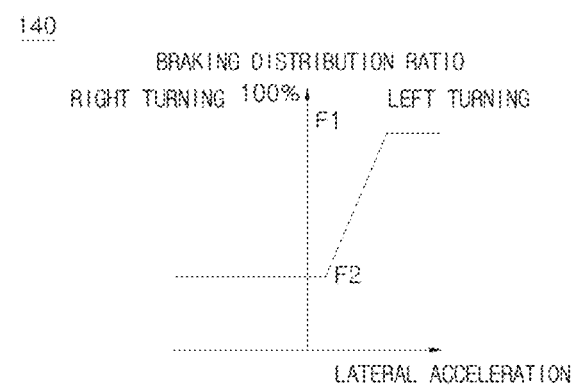

[FIG. 5a]
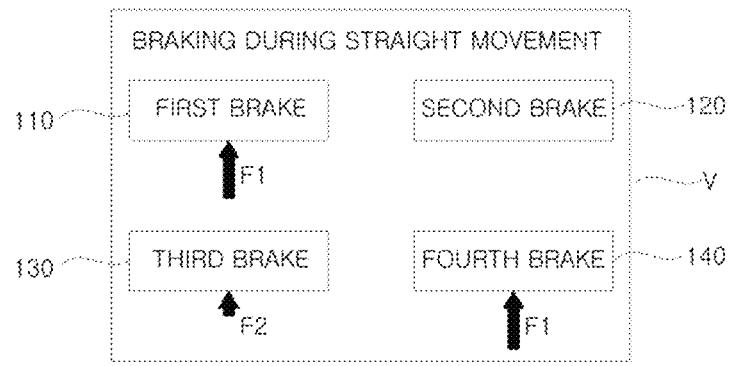
[FIG. 5b]
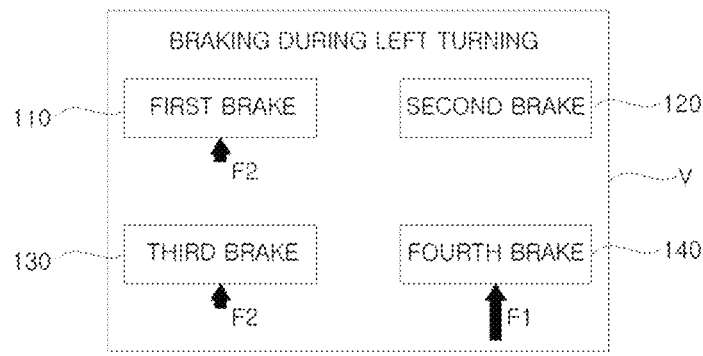
[FIG. 5c]
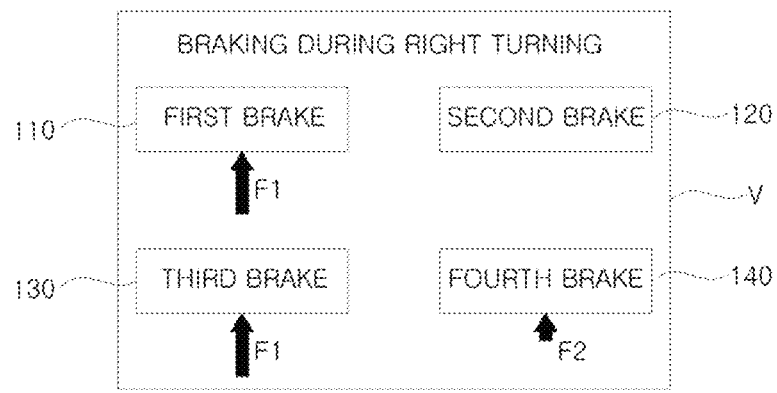

[FIG. 6a]
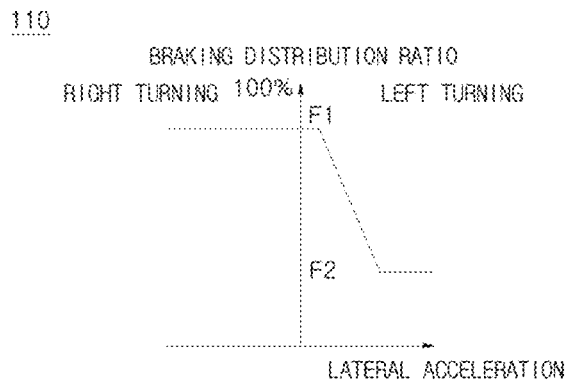
[FIG. 6b]
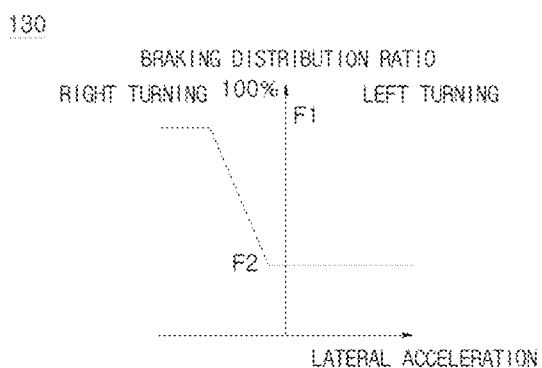
[FIG. 6c]
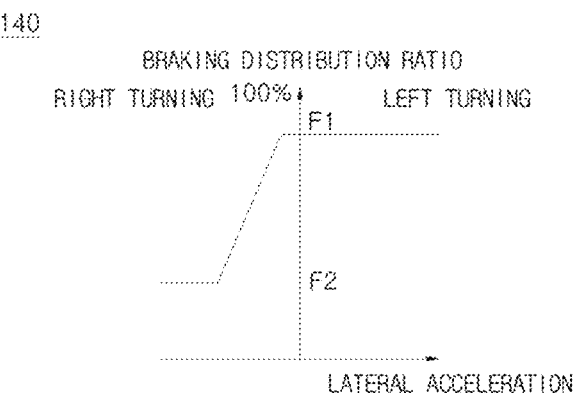

[FIG. 7a]
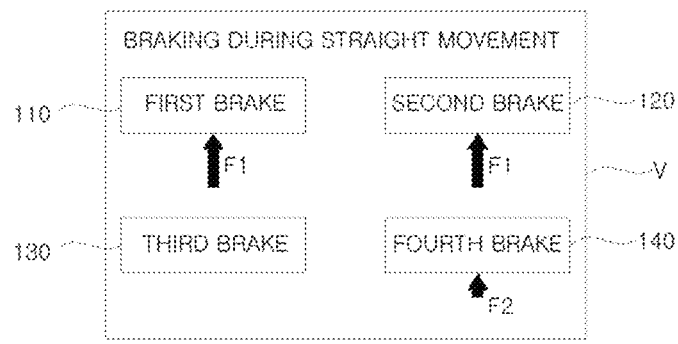
[FIG. 7b]
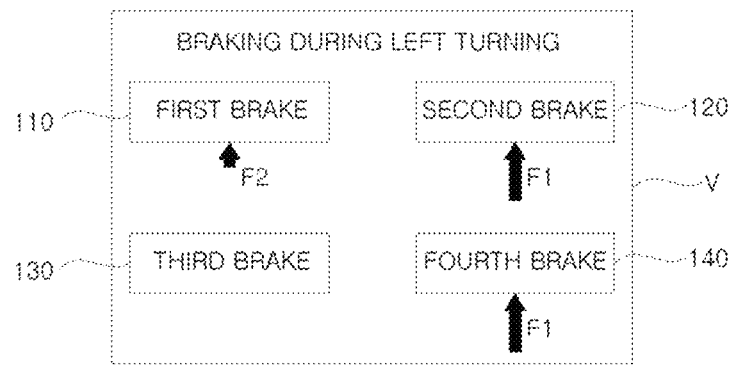
[FIG. 7c]
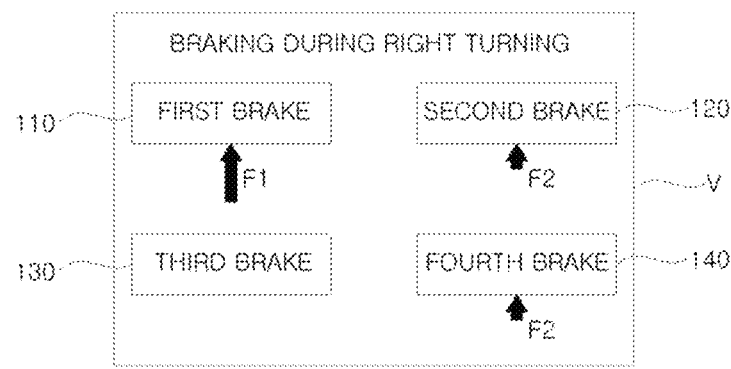

[FIG. 8a]
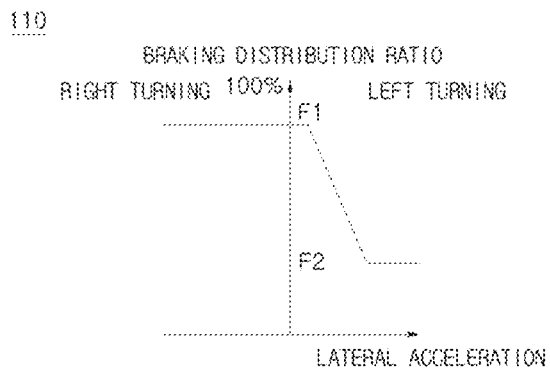
[FIG. 8b]
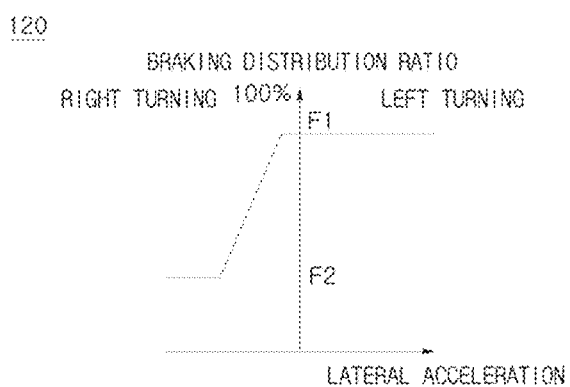
[FIG. 8c]
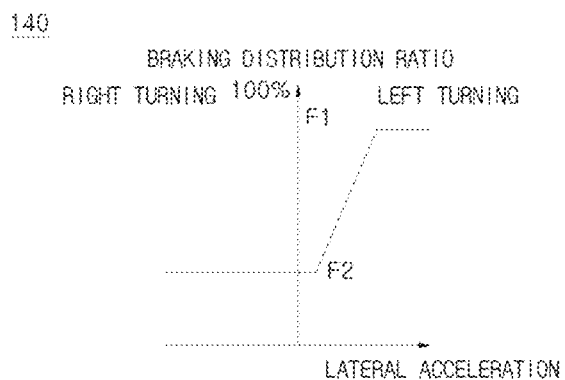

[FIG. 9a]
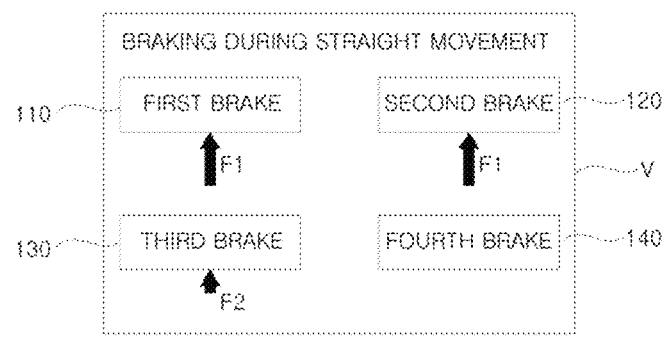
[FIG. 9b]
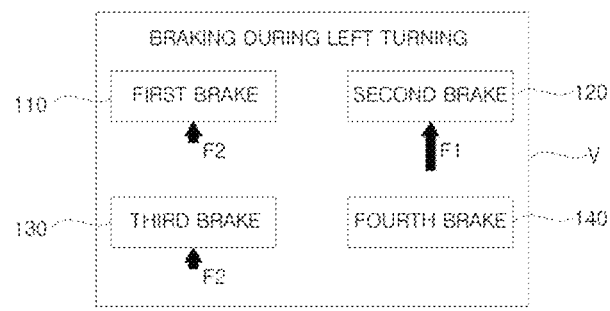
[FIG. 9c]
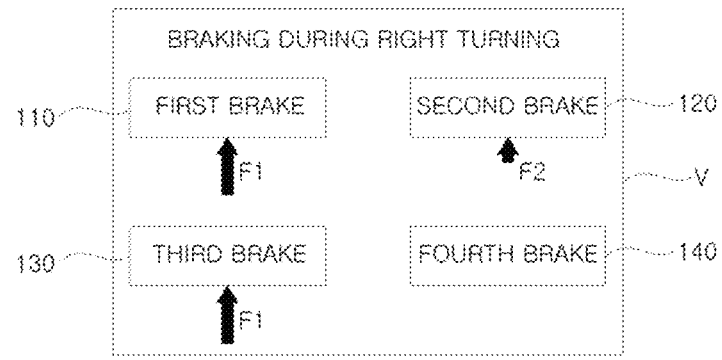

[FIG. 10a]
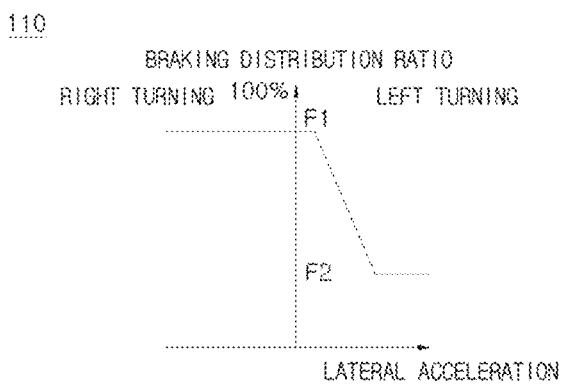
[FIG. 10b]
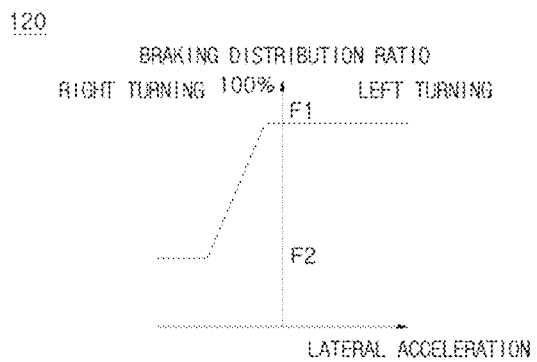
[FIG. 10c]
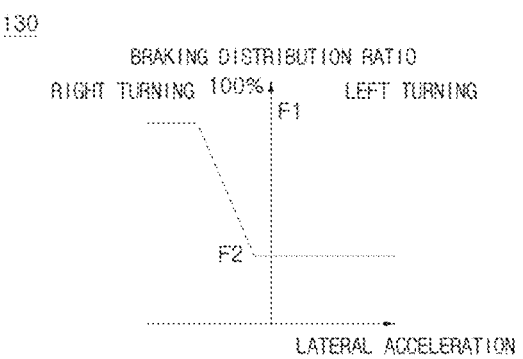

[FIG. 11]
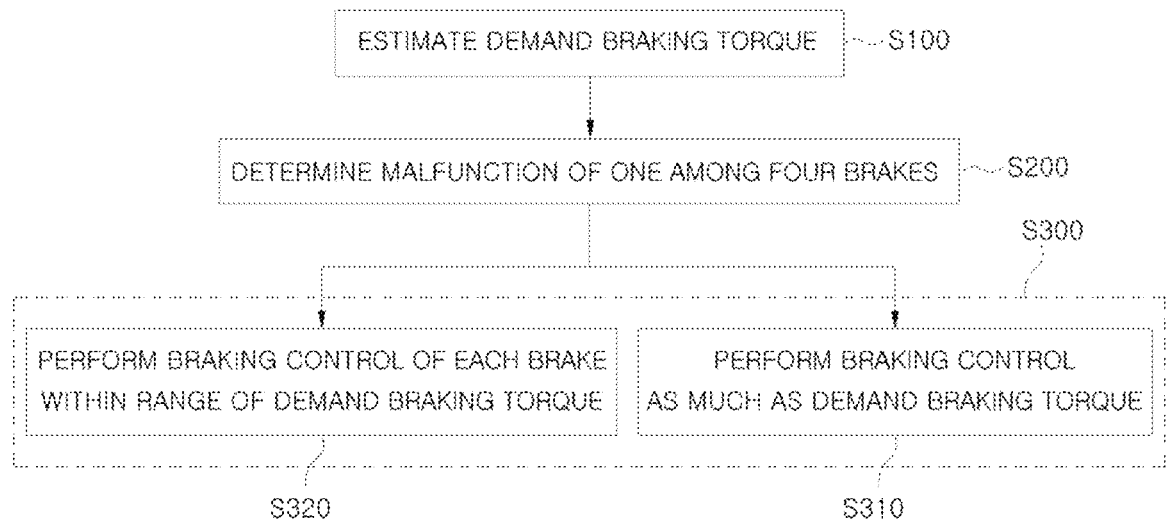

ELECTROMECHANICAL BRAKE SYSTEM AND CONTROL METHOD THEREOF

CROSS-REFERENCE TO RELATED APPLICATION

This application claims the benefit of Korean Patent Application No. 10-2023-0022685, filed on Feb. 21, 2023, in the Korean Intellectual Property Office, the disclosure of which is incorporated herein by reference.

BACKGROUND

1. Field

Embodiments of the present disclosure relates to an electromechanical brake system and a control method thereof, and more particularly, to an electromechanical brake system which is capable of performing a stable braking even when any one of the electromechanical brakes respectively provided on four wheels of a vehicle is damaged, and to a control method thereof.

2. Description of the Related Art

A brake system for braking is essentially installed on a vehicle, and various types of brake systems have been proposed in order to obtain a stable and effective braking force.

A typical brake system according to the related art includes a disk configured to rotate together with a wheel of a vehicle, a carrier in which a pair of pad plates are installed to be movable forward and backward so as to press the disk, and a piston installed to be slidable in the carrier, and uses a method in which brake oil presses the piston toward the disk to implement braking of wheel cylinders when a driver depresses a brake pedal.

However, in recent years, due to the increased market demands for various braking functions in a detailed response to the operating environment of the vehicle, a method of receiving an electrical signal as the driver's intention to brake when the driver depresses the brake pedal and generating braking force in an electromechanical manner using a motor and various gear structures has been developed.

This electromechanical brake system operates individually by mounting the electromechanical brakes on the four wheels of the vehicle, respectively. Accordingly, there is a limitation in that the electromechanical brake system does not take it into account when any one among the four electromechanical brakes malfunctions, and the other three are normally operated so that the vehicle is rapidly pulled to one side, thereby making it impossible to perform normal braking or further causing an accident.

SUMMARY

Therefore, it is an aspect of the present disclosure to provide an electromechanical brake system, which is capable of performing stable braking control even when any one among the electromechanical brake devices provided on the wheels of a vehicle, respectively, malfunctions, and a control method of the electromechanical brake system.

Additional aspects of the disclosure will be set forth in part in the description which follows and, in part, will be obvious from the description, or may be learned by practice of the disclosure.

In accordance with one aspect of the present disclosure, there is provided an electromechanical brake system including: electromechanical brakes respectively provided on four wheels of a vehicle; a sensor part that outputs a signal which corresponds to or is capable of estimating whether each of the electromechanical brakes is normal and a driver demand braking torque generated based on the speed and lateral acceleration of the vehicle and a brake pedal operation of a driver; and a controller that estimates a demand braking torque based on the signal received from the sensor part and determines whether the electromechanical brakes are normal, wherein the controller performs a braking control as much as the demand braking torque based on the determination that the electromechanical brakes are normal, and performs a braking control by distributing, within a range of the demand braking torque, braking torques based on the lateral acceleration of the vehicle to the respective other electromechanical brakes except the electromechanical brake determined to malfunction based on the determination that there is a malfunction of any one among the electromechanical brakes.

The controller may estimate the demand braking torque based on a larger value between the driver demand braking torque and an advanced driver assistance system (ADAS) demand braking torque according to an ADAS function.

The controller may determine that there is a malfunction of the electromechanical brake provided on a left front wheel of the vehicle, and when the vehicle is moving straight, the controller may distribute the braking torque of the electromechanical brake provided on a right rear wheel of the vehicle to be smaller than the braking torques of the electromechanical brakes provided on a right front wheel and a left rear wheel of the vehicle.

The controller may determine that there is a malfunction of the electromechanical brake provided on the left front wheel of the vehicle, and when the vehicle is turning to the left, the controller may distribute the braking torque of the electromechanical brake provided on the left rear wheel of the vehicle to be smaller than the braking torques of the electromechanical brakes provided on the right front wheel and the right rear wheel of the vehicle.

The controller may determine that there is a malfunction of the electromechanical brake provided on the left front wheel of the vehicle, and when the vehicle is turning to the right, the controller may distribute the braking torque of the electromechanical brake provided on the left rear wheel of the vehicle to be larger than the braking torques of the electromechanical brakes provided on the right front wheel and the right rear wheel of the vehicle.

The controller may determine that there is a malfunction of the electromechanical brake provided on the right front wheel of the vehicle, and when the vehicle is moving straight, the controller may distribute the braking torque of the electromechanical brake provided on the left rear wheel of the vehicle to be smaller than the braking torques of the electromechanical brakes provided on the left front wheel and the right rear wheel of the vehicle.

The controller may determine that there is a malfunction of the electromechanical brake provided on the right front wheel of the vehicle, and when the vehicle is turning to the left, the controller may distribute the braking torque of the electromechanical brake provided on the right rear wheel of the vehicle to be larger than the braking torques of the electromechanical brakes provided on the left front wheel and the left rear wheel of the vehicle.

The controller may determine that there is a malfunction of the electromechanical brake provided on the right front wheel of the vehicle, and when the vehicle is turning to the right, the controller may distribute the braking torque of the electromechanical brake provided on the right rear wheel of the vehicle to be smaller than the braking torques of the electromechanical brakes provided on the left front wheel and the left rear wheel of the vehicle.

The controller may determine that there is a malfunction of the electromechanical brake provided on the left rear wheel of the vehicle, and when the vehicle is moving straight, the controller may distribute the braking torque of the electromechanical brake provided on the right rear wheel of the vehicle to be smaller than the braking torques of the electromechanical brakes provided on the left front wheel and the right front wheel of the vehicle.

The controller may determine that there is a malfunction of the electromechanical brake provided on the left rear wheel of the vehicle, and when the vehicle is turning to the left, the controller may distribute the braking torque of the electromechanical brake provided on the left front wheel of the vehicle to be smaller than the braking torques of the electromechanical brakes provided on the right front wheel and the right rear wheel of the vehicle.

The controller may determine that there is a malfunction of the electromechanical brake provided on the left rear wheel of the vehicle, and when the vehicle is turning to the right, the controller may distribute the braking torque of the electromechanical brake provided on the left front wheel of the vehicle to be larger than the braking torques of the electromechanical brakes provided on the right front wheel and the right rear wheel of the vehicle.

The controller may determine that there is a malfunction of the electromechanical brake provided on the right rear wheel of the vehicle, and when the vehicle is moving straight, the controller may distribute the braking torque of the electromechanical brake provided on the left rear wheel of the vehicle to be smaller than the braking torques of the electromechanical brakes provided on the left front wheel and the right front wheel of the vehicle.

The controller may determine that there is a malfunction of the electromechanical brake provided on the right rear wheel of the vehicle, and when the vehicle is turning to the left, the controller may distribute the braking torque of the electromechanical brake provided on the right front wheel of the vehicle to be larger than the braking torque of the electromechanical brakes provided on the left front wheel and the left rear wheel of the vehicle.

The controller may determine that there is a malfunction of the electromechanical brake provided on the right rear wheel of the vehicle, and when the vehicle is turning to the right, the controller may distribute the braking torque of the electromechanical brake provided on the right front wheel of the vehicle to be smaller than the braking torque of the electromechanical brakes provided on the left front wheel and the left rear wheel of the vehicle.

In accordance with another aspect of the present disclosure, there is provided a control method of an electromechanical brake system, the method including: estimating a demand braking torque generated based on the speed and lateral acceleration of a vehicle and a driver demand braking torque by a brake pedal operation of a driver; determining whether any one among the electromechanical brakes is normal based on a signal received from electromechanical brakes respectively provided on four wheels of the vehicle; performing a braking control as much as the demand braking torque when it is determined that the electromechanical brakes are normal; and performing a braking control by distributing, within a range of the demand braking torque, braking torques based on the lateral acceleration of the vehicle to the respective other electromechanical brakes except the electromechanical brake determined to malfunction when it is determined that there is a malfunction of any one among the electromechanical brakes.

The estimating of the demand braking torque may include estimating the demand braking torque based on a larger value between the driver demand braking torque and the ADAS demand braking torque according to the ADAS function.

The performing of the braking control by distributing, within the range of the demand braking torque, the braking torques based on the lateral acceleration of the vehicle may include, upon the determination of malfunction of the electromechanical brake provided on the left front wheel of the vehicle, distributing the braking torque of the electromechanical brake provided on the right rear wheel of the vehicle to be smaller than the braking torques of the electromechanical brakes provided on the right front wheel and the left rear wheel of the vehicle when the vehicle is moving straight, distributing the braking torque of the electromechanical brake provided on the left rear wheel of the vehicle to be smaller than the braking torques of the electromechanical brakes provided on the right front wheel and the right rear wheel of the vehicle when the vehicle is turning to the left, and distributing the braking torque of the electromechanical brake provided on the left rear wheel of the vehicle to be larger than the braking torques of the electromechanical brakes provided on the right front wheel and the right rear wheel of the vehicle when the vehicle is turning to the right.

The performing of the braking control by distributing, within the range of the demand braking torque, the braking torques based on the lateral acceleration of the vehicle may include, upon the determination of malfunction of the electromechanical brake provided on the right front wheel of the vehicle, distributing the braking torque of the electromechanical brake provided on the left rear wheel of the vehicle to be smaller than the braking torques of the electromechanical brakes provided on the left front wheel and the right rear wheel of the vehicle when the vehicle is moving straight, distributing the braking torque of the electromechanical brake provided on the right rear wheel of the vehicle to be larger than the braking torques of the electromechanical brakes provided on the left front wheel and the left rear wheel of the vehicle when the vehicle is turning to the left, and distributing the braking torque of the electromechanical brake provided on the right rear wheel of the vehicle to be smaller than the braking torques of the electromechanical brakes provided on the left front wheel and the left rear wheel of the vehicle when the vehicle is turning to the right.

The performing of the braking control by distributing, within the range of the demand braking torque, the braking torques based on the lateral acceleration of the vehicle may include, upon the determination of malfunction of the electromechanical brake provided on the left rear wheel of the vehicle, distributing the braking torque of the electromechanical brake provided on the right rear wheel of the vehicle to be smaller than the braking torques of the electromechanical brakes provided on the left front wheel and the right front wheel of the vehicle when the vehicle is moving straight, distributing the braking torque of the electromechanical brake provided on the left front wheel of the vehicle to be smaller than the braking torques of the electromechanical brakes provided on the right front wheel and the right rear wheel of the vehicle when the vehicle is turning to the left, and distributing the braking torque of the electromechanical brake provided on the left front wheel of the vehicle to be larger than the braking torques of the electromechanical brakes provided on the right front wheel and the right rear wheel of the vehicle when the vehicle is turning to the right.

The performing of the braking control by distributing, within the range of the demand braking torque, the braking torques based on the lateral acceleration of the vehicle may include, upon the determination of malfunction of the electromechanical brake provided on the right rear wheel of the vehicle, distributing the braking torque of the electromechanical brake provided on the left rear wheel of the vehicle to be smaller than the braking torques of the electromechanical brakes provided on the left front wheel and the right front wheel of the vehicle when the vehicle is moving straight, distributing the braking torque of the electromechanical brake provided on the right front wheel of the vehicle to be larger than the braking torques of the electromechanical brakes provided on the left front wheel and the left rear wheel of the vehicle when the vehicle is turning to the left, and distributing the braking torque of the electromechanical brake provided on the right front wheel of the vehicle to be smaller than the braking torques of the electromechanical brakes provided on the left front wheel and the left rear wheel of the vehicle when the vehicle is turning to the right.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a schematic view illustrating an entire configuration of an electromechanical brake system according to an embodiment of the present disclosure;

FIG. 2 is a flowchart illustrating an operation algorithm of the electromechanical brake system according to the embodiment of the present disclosure;

FIG. 3A is a block diagram illustrating braking torques provided to the other brakes during the straight movement of a vehicle when a first brake malfunctions in the electromechanical brake system according to the embodiment of the present disclosure;

FIG. 3B is a block diagram illustrating braking torques provided to the other brakes during the left turning of the vehicle when the first brake malfunctions in the electromechanical brake system according to the embodiment of the present disclosure;

FIG. 3C is a block diagram illustrating braking torques provided to the other brakes during the right turning of the vehicle when the first brake malfunctions in the electromechanical brake system according to the embodiment of the present disclosure;

FIG. 4A is a graph showing a rate of change in the distribution, depending on the lateral acceleration, of demand braking torques provided to the other brakes during the straight movement of the vehicle when the first brake malfunctions in the electromechanical brake system according to the embodiment of the present disclosure;

FIG. 4B is a graph showing a rate of change in the distribution, depending on the lateral acceleration, of demand braking torques provided to the other brakes during the left turning of the vehicle when the first brake malfunctions in the electromechanical brake system according to the embodiment of the present disclosure;

FIG. 4C is a graph showing a rate of change in the distribution, depending on the lateral acceleration, of demand braking torques provided to the other brakes during the right turning of the vehicle when the first brake malfunctions in the electromechanical brake system according to the embodiment of the present disclosure;

FIG. 5A is a block diagram illustrating braking torques provided to the other brakes during the straight movement of the vehicle when a second brake malfunctions in the electromechanical brake system according to the embodiment of the present disclosure;

FIG. 5B is a block diagram illustrating braking torques provided to the other brakes during the left turning of the vehicle when the second brake malfunctions in the electromechanical brake system according to the embodiment of the present disclosure;

FIG. 5C is a block diagram illustrating braking torques provided to the other brakes during the right turning of the vehicle when the second brake malfunctions in the electromechanical brake system according to the embodiment of the present disclosure;

FIG. 6A is a graph showing a rate of change in the distribution, depending on the lateral acceleration, of demand braking torques provided to the other brakes during the straight movement of the vehicle when the second brake malfunctions in the electromechanical brake system according to the embodiment of the present disclosure;

FIG. 6B is a graph showing a rate of change in the distribution, depending on the lateral acceleration, of demand braking torques provided to the other brakes during the left turning of the vehicle when the second brake malfunctions in the electromechanical brake system according to the embodiment of the present disclosure;

FIG. 6C is a graph showing a rate of change in the distribution, depending on the lateral acceleration, of demand braking torques provided to the other brakes during the right turning of the vehicle when the second brake malfunctions in the electromechanical brake system according to the embodiment of the present disclosure;

FIG. 7A is a block diagram illustrating braking torques provided to the other brakes during the straight movement of the vehicle when a third brake malfunctions in the electromechanical brake system according to the embodiment of the present disclosure;

FIG. 7B is a block diagram illustrating braking torques provided to the other brakes during the left turning of the vehicle when the third brake malfunctions in the electromechanical brake system according to the embodiment of the present disclosure;

FIG. 7C is a block diagram illustrating braking torques provided to the other brakes during the right turning of the vehicle when the third brake malfunctions in the electromechanical brake system according to the embodiment of the present disclosure;

FIG. 8A is a graph showing a rate of change in the distribution, depending on the lateral acceleration, of demand braking torques provided to the other brakes during the straight movement of the vehicle when the third brake malfunctions in the electromechanical brake system according to the embodiment of the present disclosure;

FIG. 8B is a graph showing a rate of change in the distribution, depending on the lateral acceleration, of demand braking torques provided to the other brakes during the left turning of the vehicle when the third brake malfunctions in the electromechanical brake system according to the embodiment of the present disclosure;

FIG. 8C is a graph showing a rate of change in the distribution, depending on the lateral acceleration, of demand braking torques provided to the other brakes during the right turning of the vehicle when the third brake malfunctions in the electromechanical brake system according to the embodiment of the present disclosure;

FIG. 9A is a block diagram illustrating braking torques provided to the other brakes during the straight movement of the vehicle when a fourth brake malfunctions in the electromechanical brake system according to the embodiment of the present disclosure;

FIG. 9B is a block diagram illustrating braking torques provided to the other brakes during the left turning of the vehicle when the fourth brake malfunctions in the electromechanical brake system according to the embodiment of the present disclosure;

FIG. 9C is a block diagram illustrating braking torques provided to the other brakes during the right turning of the vehicle when the fourth brake malfunctions in the electromechanical brake system according to the embodiment of the present disclosure;

FIG. 10A is a graph showing a rate of change in the distribution, depending on the lateral acceleration, of demand braking torques provided to the other brakes during the straight movement of the vehicle when the fourth brake malfunctions in the electromechanical brake system according to the embodiment of the present disclosure;

FIG. 10B is a graph showing a rate of change in the distribution, depending on the lateral acceleration, of demand braking torques provided to the other brakes during the left turning of the vehicle when the fourth brake malfunctions in the electromechanical brake system according to the embodiment of the present disclosure;

FIG. 10C is a graph showing a rate of change in the distribution, depending on the lateral acceleration, of demand braking torques provided to the other brakes during the right turning of the vehicle when the fourth brake malfunctions in the electromechanical brake system according to the embodiment of the present disclosure; and FIG. 11 is a flowchart illustrating the order of a control method of the electromechanical brake system according to the embodiment of the present disclosure.

DETAILED DESCRIPTION

Hereinafter, embodiments of the present invention will be described in detail with reference to the accompanying drawings. The following embodiments are examples to provide the scope of the present invention to those skilled in the art. The present invention is not limited to the following embodiments and may be implemented in different forms. In the drawings, some portions not related to the description will be omitted and will not be shown in order to clearly describe the present disclosure, and also a size of a component may be somewhat exaggerated to help understanding.

FIG. 1 is a schematic view illustrating an entire configuration of an electromechanical brake system according to an embodiment of the present disclosure, and FIG. 2 is a flowchart illustrating an operation algorithm of the electromechanical brake system according to the embodiment of the present disclosure.

Referring to FIGS. 1 and 2, the electromechanical brake system according to the embodiment of the present disclosure includes electromechanical brakes 100 respectively provided on four wheels of a vehicle, a sensor part 200 that outputs a signal corresponding to a behavior of the vehicle, and a controller 300 that performs a braking control of the vehicle based on the signal received from the sensor part 200.

The electromechanical brakes (EMBs) 100 are performed by using a mechanical operating principle and an actuator driven by an electric motor, have a high response speed, and may precisely and independently control each wheel, thereby improving braking safety performance.

More specifically, the electromechanical brakes 100 include a first brake 110 provided on a left front wheel, a second brake 120 provided on a right front wheel, a third brake 130 provided on a left rear wheel, and a fourth brake 140 provided on a right rear wheel.

The first brake 110, the second brake 120, the third brake 130, and the fourth brake 140 are provided to transmit and receive signals to and from the controller 300 to brake the respective wheels.

The sensor part 200 may be provided with sensors that output signals corresponding to driver demand braking torques caused by the speed and lateral acceleration of the vehicle and the brake operation of the driver, respectively, or output signals that do not directly correspond to the driver demand braking torques, but may estimate the driver demand braking torques.

For example, the sensor part 200 may include a wheel speed sensor, a steering angle sensor, a lateral acceleration sensor, a yaw rate sensor, a pedal travel sensor, and the like.

The controller 300 may include a processor 310 and a memory 320.

The processor 310 may control the overall operation of the electromechanical brake system according to an embodiment of the present disclosure.

The memory 320 may store a program for processing or controlling the processor 310 and various data for operating the electromechanical brake system according to the embodiment of the present disclosure.

For example, the memory 320 may include not only volatile memories such as S-RAM and D-RAM, but also non-volatile memories such as a flash memory, Read Only Memory (ROM), and Erasable Programmable Read Only Memory (EPROM).

The controller 300 estimates a demand braking torque based on the signal received from the sensor part 200, and determines whether the electromechanical brakes are normal.

Here, the demand braking torque refers to a braking torque to be provided to each wheel for braking the vehicle based on the speed, the turning direction, and the lateral acceleration of the vehicle, and a driver demand braking torque, and an Advanced Driver Assistance System (ADAS) demand braking torque according to an ADAS function.

More specifically, the demand braking torque may be estimated based on the speed and lateral acceleration of the vehicle and a larger value between the driver demand braking torque and the ADAS demand braking torque according to the ADAS function.

In this case, the turning direction of the vehicle may be estimated through the lateral acceleration direction of the vehicle.

In addition, in order to determine whether the electromechanical brakes are normal, the controller 300 may determine that there is a malfunction of the electromechanical brake when signals respectively received from the first brake 110, the second brake 120, the third brake 130, and the fourth brake 140 are out of a normal range or do not receive a signal itself.

The controller 300 performs a braking control as much as the demand braking torque based on the determination that the electromechanical brakes 100 are normal, and performs a braking control by distributing, within a range of the demand braking torque, a braking torque based on the lateral acceleration of the vehicle to each of the remaining electromechanical brakes 100 except the electromechanical brake 100 determined to malfunction based on the determination that there is a malfunction of any one among the electromechanical brakes 100.

Here, the phrase "within a range of the demand braking torque" means 0% to 100% when the demand braking torque estimated by the controller 300 is 100%, and the lower limit F2 and the upper limit F1 may be set through a test.

FIG. 3A is a block diagram illustrating braking torques provided to the other brakes during the straight movement of a vehicle when a first brake malfunctions in the electromechanical brake system according to the embodiment of the present disclosure;

FIG. 3B is a block diagram illustrating braking torques provided to the other brakes during the left turning of the vehicle when the first brake malfunctions in the electromechanical brake system according to the embodiment of the present disclosure;

FIG. 3C is a block diagram illustrating braking torques provided to the other brakes during the right turning of the vehicle when the first brake malfunctions in the electromechanical brake system according to the embodiment of the present disclosure;

FIG. 4A is a graph showing a rate of change in the distribution, depending on the lateral acceleration, of demand braking torques provided to the other brakes during the straight movement of the vehicle when the first brake malfunctions in the electromechanical brake system according to the embodiment of the present disclosure;

FIG. 4B is a graph showing a rate of change in the distribution, depending on the lateral acceleration, of demand braking torques provided to the other brakes during the left turning of the vehicle when the first brake malfunctions in the electromechanical brake system according to the embodiment of the present disclosure; and FIG. 4C is a graph showing a rate of change in the distribution, depending on the lateral acceleration, of demand braking torques provided to the other brakes during the right turning of the vehicle when the first brake malfunctions in the electromechanical brake system according to the embodiment of the present disclosure.

Referring to FIGS. 3 and 4, when the controller 300 determines that there is a malfunction of the first brake 110, the controller 300 distributes the demand braking torques as follows.

When the vehicle V is moving straight, as illustrated in FIG. 3A, the braking torques F1 distributed to the second brake 120 and the third brake 130 are larger than the braking torque F2 distributed to the fourth brake 140.

When the vehicle V is turning to the left, as illustrated in FIG. 3B, the braking torques F1 distributed to the second brake 120 and the fourth brake 140 are larger than the braking torque F2 distributed to the third brake 130.

When the vehicle V is turning to the right, as illustrated in FIG. 3C, the braking torque F1 distributed to the third brake 130 is larger than the braking torques F2 distributed to the second brake 120 and the fourth brake 140.

As illustrated in FIG. 4A, the braking torque in the second brake 120 increases to be close to the upper limit F1 of a range of the demand braking torque as the lateral acceleration of the vehicle increases, and the wheel is braked with a larger braking torque when the vehicle is moving straight or turning to the left than when the vehicle is turning to the right.

As illustrated in FIG. 4B, the braking torque in the third brake 130 decreases to be close to the lower limit F2 of the range of the demand braking torque as the lateral acceleration of the vehicle increases, and the wheel is braked with a larger braking torque when the vehicle is moving straight or turning to the right than when the vehicle is turning to the left.

As illustrated in FIG. 4C, the braking torque in the fourth brake 140 increases to be close to the upper limit F1 of the range of the demand braking torque as the lateral acceleration of the vehicle increases, and the wheel is braked with a larger braking torque when the vehicle is turning to the left than when the vehicle is turning to the right or moving straight.

FIG. 5A is a block diagram illustrating braking torques provided to the other brakes during the straight movement of the vehicle when a second brake malfunctions in the electromechanical brake system according to the embodiment of the present disclosure;

FIG. 5B is a block diagram illustrating braking torques provided to the other brakes during the left turning of the vehicle when the second brake malfunctions in the electromechanical brake system according to the embodiment of the present disclosure;

FIG. 5C is a block diagram illustrating braking torques provided to the other brakes during the right turning of the vehicle when the second brake malfunctions in the electromechanical brake system according to the embodiment of the present disclosure;

FIG. 6A is a graph showing a rate of change in the distribution, depending on the lateral acceleration, of demand braking torques provided to the other brakes during the straight movement of the vehicle when the second brake malfunctions in the electromechanical brake system according to the embodiment of the present disclosure;

FIG. 6B is a graph showing a rate of change in the distribution, depending on the lateral acceleration, of demand braking torques provided to the other brakes during the left turning of the vehicle when the second brake malfunctions in the electromechanical brake system according to the embodiment of the present disclosure; and FIG. 6C is a graph showing a rate of change in the distribution, depending on the lateral acceleration, of demand braking torques provided to the other brakes during the right turning of the vehicle when the second brake malfunctions in the electromechanical brake system according to the embodiment of the present disclosure.

Referring to FIGS. 5 and 6, when the controller 300 determines that there is a malfunction of the second brake 120, the controller 300 distributes the demand braking torques as follows.

When the vehicle V is moving straight, as illustrated in FIG. 5A, the braking torques F1 distributed to the first brake 110 and the third brake 140 are larger than the braking torque F2 distributed to the third brake 130.

When the vehicle V is turning to the left, as illustrated in FIG. 5B, the braking torque F1 distributed to the fourth brake 140 is larger than the braking torques F2 distributed to the first brake 110 and the third brake 130.

When the vehicle V is turning to the right, as illustrated in FIG. 5C, the braking torques F1 distributed to the first brake 110 and the third brake 130 are larger than the braking torque F2 distributed to the fourth brake 140.

As illustrated in FIG. 6A, the braking torque in the first brake 110 decreases to be close to the lower limit F2 of the range of the demand braking torque as the lateral acceleration of the vehicle increases, and the wheel is braked with a larger braking torque when the vehicle is moving straight or turning to the right than when the vehicle is turning to the left.

As illustrated in FIG. 6B, the braking torque in the third brake 130 decreases to be close to the lower limit F2 of the range of the demand braking torque as the lateral acceleration of the vehicle increases, and the wheel is braked with a larger braking torque when the vehicle is turning to the right than when the vehicle is turning to the left or moving straight.

As illustrated in FIG. 6C, the braking torque in the fourth brake 140 increases to be close to the upper limit F1 of the range of the demand braking torque as the lateral acceleration of the vehicle increases, and the wheel is braked with a larger braking torque when the vehicle is moving straight or turning to the left than when the vehicle is turning to the right.

FIG. 7A is a block diagram illustrating braking torques provided to the other brakes during the straight movement of the vehicle when a third brake malfunctions in the electromechanical brake system according to the embodiment of the present disclosure;

FIG. 7B is a block diagram illustrating braking torques provided to the other brakes during the left turning of the vehicle when the third brake malfunctions in the electromechanical brake system according to the embodiment of the present disclosure;

FIG. 7C is a block diagram illustrating braking torques provided to the other brakes during the right turning of the vehicle when the third brake malfunctions in the electromechanical brake system according to the embodiment of the present disclosure;

FIG. 8A is a graph showing a rate of change in the distribution, depending on the lateral acceleration, of demand braking torques provided to the other brakes during the straight movement of the vehicle when the third brake malfunctions in the electromechanical brake system according to the embodiment of the present disclosure;

FIG. 8B is a graph showing a rate of change in the distribution, depending on the lateral acceleration, of demand braking torques provided to the other brakes during the left turning of the vehicle when the third brake malfunctions in the electromechanical brake system according to the embodiment of the present disclosure; and FIG. 8C is a graph showing a rate of change in the distribution, depending on the lateral acceleration, of demand braking torques provided to the other brakes during the right turning of the vehicle when the third brake malfunctions in the electromechanical brake system according to the embodiment of the present disclosure.

Referring to FIGS. 7 and 8, when the controller 300 determines that there is a malfunction of the third brake 130, the controller 300 distributes the demand braking torques as follows.

When the vehicle V is moving straight, as illustrated in FIG. 7A, the braking torques F1 distributed to the first brake 110 and the third brake 120 are larger than the braking torque F2 distributed to the fourth brake 140.

When the vehicle V is turning to the left, as illustrated in FIG. 7B, the braking torques F1 distributed to the second brake 120 and the fourth brake 140 are larger than the braking torque F2 distributed to the first brake 110.

When the vehicle V is turning to the right, as illustrated in FIG. 7C, the braking torque F1 distributed to the first brake 110 is larger than the braking torques F2 distributed to the second brake 120 and the fourth brake 140.

As illustrated in FIG. 8A, the braking torque in the first brake 110 decreases to be close to the lower limit F2 of the range of the demand braking torque as the lateral acceleration of the vehicle increases, and the wheel is braked with a larger braking torque when the vehicle is turning to the right than when the vehicle is turning to the left or moving straight.

As illustrated in FIG. 8B, the braking torque in the second brake 120 increases to be close to the upper limit F1 of the range of the demand braking torque as the lateral acceleration of the vehicle increases, and the wheel is braked with a larger braking torque when the vehicle is moving straight or turning to the left than when the vehicle is turning to the right.

As illustrated in FIG. 8C, the braking torque in the fourth brake 140 increases to be close to the upper limit F1 of the range of the demand braking torque as the lateral acceleration of the vehicle increases, and the wheel is braked with a larger braking torque when the vehicle is turning to the left than when the vehicle is turning to the right or moving straight.

FIG. 9A is a block diagram illustrating braking torques provided to the other brakes during the straight movement of the vehicle when a fourth brake malfunctions in the electromechanical brake system according to the embodiment of the present disclosure;

FIG. 9B is a block diagram illustrating braking torques provided to the other brakes during the left turning of the vehicle when the fourth brake malfunctions in the electromechanical brake system according to the embodiment of the present disclosure;

FIG. 9C is a block diagram illustrating braking torques provided to the other brakes during the right turning of the vehicle when the fourth brake malfunctions in the electromechanical brake system according to the embodiment of the present disclosure;

FIG. 10A is a graph showing a rate of change in the distribution, depending on the lateral acceleration, of demand braking torques provided to the other brakes during the straight movement of the vehicle when the fourth brake malfunctions in the electromechanical brake system according to the embodiment of the present disclosure;

FIG. 10B is a graph showing a rate of change in the distribution, depending on the lateral acceleration, of demand braking torques provided to the other brakes during the left turning of the vehicle when the fourth brake malfunctions in the electromechanical brake system according to the embodiment of the present disclosure; and FIG. 10C is a graph showing a rate of change in the distribution, depending on the lateral acceleration, of demand braking torques provided to the other brakes during the right turning of the vehicle when the fourth brake malfunctions in the electromechanical brake system according to the embodiment of the present disclosure.

Referring to FIGS. 9 and 10, when the controller 300 determines that there is a malfunction of the fourth brake 140, the controller 300 distributes the demand braking torques as follows.

When the vehicle V is moving straight, as illustrated in FIG. 9A, the braking torques F1 distributed to the first brake 110 and the second brake 120 are larger than the braking torque F2 distributed to the third brake 130.

When the vehicle V is turning to the left, as illustrated in FIG. 9B, the braking torque F1 distributed to the second brake 120 is larger than the braking torques F2 distributed to the first brake 110 and the third brake 130.

When the vehicle V is turning to the right, as illustrated in FIG. 9C, the braking torques F1 distributed to the first brake 110 and the third brake 130 are larger than the braking torque F2 distributed to the second brake 120.

As illustrated in FIG. 10A, the braking torque in the first brake 110 decreases to be close to the lower limit F2 of the range of the demand braking torque as the lateral acceleration of the vehicle increases, and the wheel is braked with a larger braking torque when the vehicle is turning to the left than when the vehicle is turning to the right or moving straight.

As illustrated in FIG. 10B, the braking torque in the second brake 120 increases to be close to the upper limit F1 of the range of the demand braking torque as the lateral acceleration of the vehicle increases, and the wheel is braked with a larger braking torque when the vehicle is moving straight or turning to the right than when the vehicle is turning to the left.

As illustrated in FIG. 10C, the braking torque in the third brake 130 decreases to be close to the lower limit F2 of the range of demand braking torque as the lateral acceleration of the vehicle increases, and the wheel is braked with a larger braking torque when the vehicle is turning to the right than when the vehicle is turning to the left or moving straight.

Accordingly, the electromechanical brake system according to the embodiment of the present disclosure may improve the stability of the vehicle since the stable braking control is possible even when any one among the electromechanical brake devices provided on the respective wheel of the vehicle malfunctions.

FIG. 11 is a flowchart illustrating the order of a control method of the electromechanical brake system according to the embodiment of the present disclosure.

Referring to FIG. 11, the control method of the electromechanical brake system according to the embodiment of the present disclosure includes estimating a demand braking torque based on the speed and lateral acceleration of a vehicle and a driver demand braking torque by a pedal operation of a driver (100), determining whether any one among the electromechanical brakes is normal based on a signal received from the electromechanical brake provided on each of four wheels of the vehicle (200), and performing a braking control of the electromechanical brakes according to the determination (300).

More specifically, the performing of the braking control of the electromechanical brakes (300) includes performing a braking control as much as the demand braking torque (310) when it is determined that the electromechanical brakes are normal.

In addition, the performing of the braking control of the electromechanical brakes (300) includes performing a braking control by distributing the braking torques based on the lateral acceleration of the vehicle within the range of the demand braking torque to the respective other electromechanical brakes except the electromechanical brake determined to malfunction (320) when it is determined that there is a malfunction of any one among the electromechanical brakes.

The estimating of the demand braking torque (100) may include estimating the demand braking torque based on a larger value between the driver demand braking torque and the ADAS demand braking torque according to the ADAS function.

The performing of the braking control by distributing, within the range of the demand braking torque, the braking torques based on the lateral acceleration of the vehicle (320) includes, upon the determination of malfunction of the electromechanical brake provided on the left front wheel of the vehicle, distributing the braking torque of the electromechanical brake provided on the right rear wheel of the vehicle to be smaller than the braking torques of the electromechanical brakes provided on the right front wheel and the left rear wheel of the vehicle when the vehicle is moving straight, distributing the braking torque of the electromechanical brake provided on the left rear wheel of the vehicle to be smaller than the braking torques of the electromechanical brakes provided on the right front wheel and the right rear wheel of the vehicle when the vehicle is turning to the left, and distributing the braking torque of the electromechanical brake provided on the left rear wheel of the vehicle to be larger than the braking torques of the electromechanical brakes provided on the right front wheel and the right rear wheel of the vehicle when the vehicle is turning to the right.

The performing of the braking control by distributing, within the range of the demand braking torque, the braking torques based on the lateral acceleration of the (320) includes, upon the determination of malfunction of the vehicle electromechanical brake provided on the right front wheel of the vehicle, distributing the braking torque of the electromechanical brake provided on the left rear wheel of the vehicle to be smaller than the braking torques of the electromechanical brakes provided on the left front wheel and the right rear wheel of the vehicle when the vehicle is moving straight, distributing the braking torque of the electromechanical brake provided on the right rear wheel of the vehicle to be larger than the braking torques of the electromechanical brakes provided on the left front wheel and the left rear wheel of the vehicle when the vehicle is turning to the left, and distributing the braking torque of the electromechanical brake provided on the right rear wheel of the vehicle to be smaller than the braking torques of the electromechanical brakes provided on the left front wheel and the left rear wheel of the vehicle when the vehicle is turning to the right.

The performing of the braking control by distributing, within the range of the demand braking torque, the braking torques based on the lateral acceleration of the vehicle (320) includes, upon the determination of malfunction of the electromechanical brake provided on the left rear wheel of the vehicle, distributing the braking torque of the electromechanical brake provided on the right rear wheel of the vehicle to be smaller than the braking torques of the electromechanical brakes provided on the left front wheel and the right front wheel of the vehicle when the vehicle is moving straight, distributing the braking torque of the electromechanical brake provided on the right front wheel of the vehicle to be smaller than the braking torques of the electromechanical brakes provided on the left front wheel and the left rear wheel of the vehicle when the vehicle is turning to the left, and distributing the braking torque of the electromechanical brake provided on the right front wheel of the vehicle to be larger than the braking torques of the electromechanical brakes provided on the right front wheel and the right rear wheel of the vehicle when the vehicle is turning to the right.

The performing of the braking control by distributing, within the range of the demand braking torque, the braking torques based on the lateral acceleration of the (320) includes, upon the determination of malfunction of the vehicle electromechanical brake provided on the right rear wheel of the vehicle, distributing the braking torque of the electromechanical brake provided on the left rear wheel of the vehicle to be smaller than the braking torques of the electromechanical brakes provided on the left front wheel and the right front wheel of the vehicle when the vehicle is moving straight, distributing the braking torque of the electromechanical brake provided on the right front wheel of the vehicle to be larger than the braking torques of the electromechanical brakes provided on the left front wheel and the left rear wheel of the vehicle when the vehicle is turning to the left, and distributing the braking torque of the electromechanical brake provided on the right front wheel of the vehicle to be smaller than the braking torques of the electromechanical brakes provided on the left front wheel and the left rear wheel of the vehicle when the vehicle is turning to the right.

Accordingly, the control method of the electromechanical brake system according to the embodiment of the present disclosure may improve the stability of the vehicle since the stable braking control is possible even when any one among the electromechanical brake devices provided on the respective wheel of the vehicle malfunctions.

The electromechanical brake system and the control method thereof according to an embodiment of the present disclosure may improve the stability of the vehicle since the stable braking control is possible even when any one among the electromechanical brake devices provided on the respective wheels of the vehicle malfunctions.

The disclosed embodiments have been described with reference to the accompanying drawings as described above. Those of ordinary skill in the art to which the present invention pertains will understand that the present invention may be practiced in other forms than the disclosed embodiments without changing the technical spirit or essential features of the present invention. The disclosed embodiments are illustrative and should not be construed as limiting.

What is claimed is:

1. An electromechanical brake system comprising:
   electromechanical brakes respectively provided on four wheels of a vehicle;
   a sensor part configured to output a signal corresponding to or being capable of estimating whether each of the electromechanical brakes is normal and a driver demand braking torque generated based on the speed and lateral acceleration of the vehicle and a brake pedal operation of a driver; and
   a controller configured to estimate a demand braking torque based on the signal received from the sensor part and determine whether the electromechanical brakes are normal,
   wherein the controller is configured to:
   perform a braking control as much as the demand braking torque based on the determination that the electromechanical brakes are normal, and
   perform a braking control by distributing in a specific pattern, within a range of the demand braking torque, braking torques based on a position of the malfunctioning electromechanical brake and a state of the vehicle including straight movement, left turning, or right turning to the respective other electromechanical brakes except the electromechanical brake determined to malfunction in response to the determination that there is a malfunction of any one among the electromechanical brakes.

2. The electromechanical brake system of claim 1, wherein the controller is configured to estimate the demand braking torque based on a larger value between the driver demand braking torque and an advanced driver assistance system (ADAS) demand braking torque according to an ADAS function.

3. The electromechanical brake system of claim 1, wherein:
   the controller is configured to determine that there is a malfunction of the electromechanical brake provided on a left front wheel of the vehicle; and
   during the straight movement of the vehicle, the controller is configured to distribute the braking torque of the electromechanical brake provided on a right rear wheel of the vehicle to be smaller than the braking torques of the electromechanical brakes provided on a right front wheel and a left rear wheel of the vehicle.

4. The electromechanical brake system of claim 1, wherein:
   the controller is configured to determine that there is a malfunction of the electromechanical brake provided on a left front wheel of the vehicle; and
   during the left turning of the vehicle, the controller is configured to distribute the braking torque of the electromechanical brake provided on a left rear wheel of the vehicle to be smaller than the braking torques of the electromechanical brakes provided on a right front wheel and a right rear wheel of the vehicle.

5. The electromechanical brake system of claim 1, wherein:
   the controller is configured to determine that there is a malfunction of the electromechanical brake provided on a left front wheel of the vehicle; and
   during the right turning of the vehicle, the controller is configured to distribute the braking torque of the electromechanical brake provided on a left rear wheel of the vehicle to be larger than the braking torques of the electromechanical brakes provided on a right front wheel and a right rear wheel of the vehicle.

6. The electromechanical brake system of claim 1, wherein:
   the controller is configured to determine that there is a malfunction of the electromechanical brake provided on a right front wheel of the vehicle; and
   during the straight movement of the vehicle, the controller is configured to distribute the braking torque of the electromechanical brake provided on a left rear wheel of the vehicle to be smaller than the braking torques of the electromechanical brakes provided on a left front wheel and a right rear wheel of the vehicle.

7. The electromechanical brake system of claim 1, wherein:
   the controller is configured to determine that there is a malfunction of the electromechanical brake provided on a right front wheel of the vehicle; and
   during the left turning of the vehicle, the controller is configured to distribute the braking torque of the electromechanical brake provided on a right rear wheel of the vehicle to be larger than the braking torques of the electromechanical brakes provided on a left front wheel and a left rear wheel of the vehicle.

8. The electromechanical brake system of claim 1, wherein:
   the controller is configured to determine that there is a malfunction of the electromechanical brake provided on a right front wheel of the vehicle; and during the right turning of the vehicle, the controller is configured to distribute the braking torque of the electromechanical brake provided on a right rear wheel of the vehicle to be smaller than the braking torques of the electromechanical brakes provided on a left front wheel and a left rear wheel of the vehicle.

9. The electromechanical brake system of claim 1, wherein:
the controller is configured to determine that there is a malfunction of the electromechanical brake provided on a left rear wheel of the vehicle; and
during the straight movement of the vehicle, the controller is configured to distribute the braking torque of the electromechanical brake provided on a right rear wheel of the vehicle to be smaller than the braking torques of the electromechanical brakes provided on a left front wheel and a right front wheel of the vehicle.

10. The electromechanical brake system of claim 1, wherein:
the controller is configured to determine that there is a malfunction of the electromechanical brake provided on a left rear wheel of the vehicle; and
during the left turning of the vehicle, the controller is configured to distribute the braking torque of the electromechanical brake provided on a left front wheel of the vehicle to be smaller than the braking torques of the electromechanical brakes provided on a right front wheel and a right rear wheel of the vehicle.

11. The electromechanical brake system of claim 1, wherein:
the controller determines that there is a malfunction of the electromechanical brake provided on a left rear wheel of the vehicle; and
during the right turning of the vehicle, the controller is configured to distribute the braking torque of the electromechanical brake provided on a left front wheel of the vehicle to be larger than the braking torques of the electromechanical brakes provided on a right front wheel and a right rear wheel of the vehicle.

12. The electromechanical brake system of claim 1, wherein:
the controller is configured to determine that there is a malfunction of the electromechanical brake provided on a right rear wheel of the vehicle; and
during the straight movement of the vehicle, the controller is configured to distribute the braking torque of the electromechanical brake provided on a left rear wheel of the vehicle to be smaller than the braking torques of the electromechanical brakes provided on a left front wheel and a right front wheel of the vehicle.

13. The electromechanical brake system of claim 1, wherein:
the controller is configured to determine that there is a malfunction of the electromechanical brake provided on a right rear wheel of the vehicle; and
during the left turning of the vehicle, the controller is configured to distribute the braking torque of the electromechanical brake provided on a right front wheel of the vehicle to be larger than the braking torques of the electromechanical brakes provided on a left front wheel and a left rear wheel of the vehicle.

14. The electromechanical brake system of claim 1, wherein:
the controller is configured to determine that there is a malfunction of the electromechanical brake provided on a right rear wheel of the vehicle;

and during the right turning of the vehicle, the controller is configured to distribute the braking torque of the electromechanical brake provided on a right front wheel of the vehicle to be smaller than the braking torques of the electromechanical brakes provided on a left front wheel and a left rear wheel of the vehicle.

15. A control method of an electromechanical brake system, the method comprising:
estimating a demand braking torque generated based on the speed and lateral acceleration of a vehicle and a driver demand braking torque by a brake pedal operation of a driver;
determining whether any one among the electromechanical brakes is normal based on a signal received from electromechanical brakes respectively provided on four wheels of the vehicle;
performing a braking control as much as the demand braking torque in response to the determination that the electromechanical brakes are normal; and
performing a braking control by distributing in a specific pattern, within a range of the demand braking torque, braking torques based on a position of the malfunctioning electromechanical brake and a state of the vehicle including straight movement, left turning, or right turning to the respective other electromechanical brakes except the electromechanical brake determined to malfunction in response to the determination that there is a malfunction of any one among the electromechanical brakes.

16. The control method of the electromechanical brake system of claim 15, wherein the estimating of the demand braking torque comprises estimating the demand braking torque based on a larger value between the driver demand braking torque and an advanced driver assistance system (ADAS) demand braking torque according to an ADAS function.

17. The control method of the electromechanical brake system of claim 15, wherein the performing of the braking control by distributing, within the range of the demand braking torque, the braking torques based on the lateral acceleration of the vehicle comprises:
upon the determination of malfunction of the electromechanical brake provided on a left front wheel of the vehicle,
distributing the braking torque of the electromechanical brake provided on a right rear wheel of the vehicle to be smaller than the braking torques of the electromechanical brakes provided on a right front wheel and a left rear wheel of the vehicle during the straight movement of the vehicle;
distributing the braking torque of the electromechanical brake provided on the left rear wheel of the vehicle to be smaller than the braking torques of the electromechanical brakes provided on the right front wheel and the right rear wheel of the vehicle during the left turning of the vehicle; and
distributing the braking torque of the electromechanical brake provided on the left rear wheel of the vehicle to be larger than the braking torques of the electromechanical brakes provided on the right front wheel and the right rear wheel of the vehicle during the right turning of the vehicle.

18. The control method of the electromechanical brake system of claim 15, wherein the performing of the braking control by distributing, within the range of the demand braking torque, the braking torques based on the lateral acceleration of the vehicle comprises:

upon the determination of malfunction of the electromechanical brake provided on a right front wheel of the vehicle, distributing the braking torque of the electromechanical brake provided on a left rear wheel of the vehicle to be smaller than the braking torques of the electromechanical brakes provided on a left front wheel and a right rear wheel of the vehicle during the straight movement of the vehicle;

distributing the braking torque of the electromechanical brake provided on the right rear wheel of the vehicle to be larger than the braking torques of the electromechanical brakes provided on the left front wheel and the left rear wheel of the vehicle during the left turning of the vehicle; and distributing the braking torque of the electromechanical brake provided on the right rear wheel of the vehicle to be smaller than the braking torques of the electromechanical brakes provided on the left front wheel and the left rear wheel of the vehicle during the right turning of the vehicle.

19. The control method of the electromechanical brake system of claim 15, wherein the performing of the braking control by distributing, within the range of the demand braking torque, the braking torques based on the lateral acceleration of the vehicle comprises:

upon the determination of malfunction of the electromechanical brake provided on a left rear wheel of the vehicle, distributing the braking torque of the electromechanical brake provided on a right rear wheel of the vehicle to be smaller than the braking torques of the electromechanical brakes provided on a left front wheel and a right front wheel of the vehicle during the straight movement of the vehicle;

distributing the braking torque of the electromechanical brake provided on the left front wheel of the vehicle to be smaller than the braking torques of the electromechanical brakes provided on the right front wheel and the right rear wheel of the vehicle during the left turning of the vehicle; and distributing the braking torque of the electromechanical brake provided on the left front wheel of the vehicle to be larger than the braking torques of the electromechanical brakes provided on the right front wheel and the right rear wheel of the vehicle during the right turning of the vehicle.

20. The control method of the electromechanical brake system of claim 15, wherein the performing of the braking control by distributing, within the range of the demand braking torque, the braking torques based on the lateral acceleration of the vehicle comprises:

upon the determination of malfunction of the electromechanical brake provided on a right rear wheel of the vehicle, distributing the braking torque of the electromechanical brake provided on a left rear wheel of the vehicle to be smaller than the braking torques of the electromechanical brakes provided on a left front wheel and a right front wheel of the vehicle during the straight movement of the vehicle;

distributing the braking torque of the electromechanical brake provided on the right front wheel of the vehicle to be larger than the braking torques of the electromechanical brakes provided on the left front wheel and the left rear wheel of the vehicle during the left turning of the vehicle; and distributing the braking torque of the electromechanical brake provided on the right front wheel of the vehicle to be smaller than the braking torques of the electromechanical brakes provided on the left front wheel and the left rear wheel of the vehicle during the right turning of the vehicle.

* * * * *